(12) United States Patent
Schack et al.

(10) Patent No.: US 12,195,276 B2
(45) Date of Patent: Jan. 14, 2025

(54) AS/RS LIFT HAVING VERTICALLY-ALIGNED DUAL CARRIAGES

(71) Applicant: Intelligrated Headquarters, LLC, Mason, OH (US)

(72) Inventors: Douglas K. Schack, Cold Spring, KY (US); Ralf Buerkle, Oregonia, OH (US); Jonathon Cleary, West Chester, OH (US); Charles Christopher Lingamfelter, Rye, NH (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 18/525,684

(22) Filed: Nov. 30, 2023

(65) Prior Publication Data
US 2024/0158171 A1    May 16, 2024

Related U.S. Application Data

(63) Continuation of application No. 17/524,238, filed on Nov. 11, 2021, now Pat. No. 11,873,163, which is a continuation of application No. 16/809,653, filed on Mar. 5, 2020, now Pat. No. 11,198,560, which is a continuation of application No. 15/414,957, filed on Jan. 25, 2017, now Pat. No. 10,611,568.

(51) Int. Cl.
*B65G 1/06*  (2006.01)
*B65G 1/04*  (2006.01)
*B65G 1/137* (2006.01)

(52) U.S. Cl.
CPC ............... *B65G 1/06* (2013.01); *B65G 1/04* (2013.01); *B65G 1/0492* (2013.01); *B65G 1/1373* (2013.01)

(58) Field of Classification Search
CPC . B65G 1/00; B65G 1/06; B65G 1/065; B65G 1/1373; B65G 1/0492; B65G 1/04
See application file for complete search history.

(56) References Cited

U.S. PATENT DOCUMENTS

| | | | |
|---|---|---|---|
| 6,406,246 B1 | 6/2002 | Itoh et al. | |
| 7,787,985 B2 | 8/2010 | Tsujimoto et al. | |
| 8,276,739 B2 | 10/2012 | Bastian, II et al. | |
| 8,439,167 B2 | 5/2013 | Kocher et al. | |

(Continued)

FOREIGN PATENT DOCUMENTS

| | | |
|---|---|---|
| CN | 101641270 A | 2/2010 |
| CN | 102725213 A | 10/2012 |

(Continued)

OTHER PUBLICATIONS

Advisory Action received for U.S. Appl. No. 16/809,653, mailed on Jul. 12, 2021, 2 pages.

(Continued)

*Primary Examiner* — Saul Rodriguez
*Assistant Examiner* — Willie W Berry, Jr.
(74) *Attorney, Agent, or Firm* — Alston & Bird LLP

(57) ABSTRACT

A material handling system has a vertical lift two vertically aligned carriages that are independently positionable on a vertical support structure by respective drive systems. A processor subsystem selects one of the two carriages to move an article from at least one in-feed conveyor to a selected level of an automated storage and retrieval system (AS/RS). The processor subsystem concurrently positions the other carriage to avoid a collision.

20 Claims, 10 Drawing Sheets

(56) References Cited

U.S. PATENT DOCUMENTS

| | | | |
|---|---|---|---|
| 8,733,507 B2 | 5/2014 | Smith et al. | |
| 2006/0285948 A1 | 12/2006 | Tsujimoto et al. | |

FOREIGN PATENT DOCUMENTS

| | | |
|---|---|---|
| CN | 104066661 A | 9/2014 |
| CN | 105392719 A | 3/2016 |
| CN | 105579370 A | 5/2016 |
| DE | 202004008678 U1 | 8/2004 |
| DE | 202006003068 U1 | 7/2005 |
| WO | 2012/155169 A1 | 11/2012 |
| WO | 2015/181108 A1 | 12/2015 |
| WO | 2015/181109 A1 | 12/2015 |

OTHER PUBLICATIONS

Annex to the communication Mailed on Jun. 28, 2019 for EP Application No. 18153253.
Annex to the communication Mailed on Mar. 9, 2020 for EP Application No. 18153253.
CN Notice of Allowance, including Search Report, Mailed on Sep. 21, 2022 for CN Application No. 201810072684, 4 pages.
CN Office Action, including Search Report, Mailed on Mar. 3, 2022 for CN Application No. 201810072684, 10 pages.
Communication about intention to grant a European patent Mailed on Aug. 5, 2020 for EP Application No. 18153253, 5 page(s).
Communication from the Examining Division Mailed on Jun. 28, 2019 for EP Application No. 18153253.
Communication pursuant to Article 94(3) for European Application No. 18153253.2, dated Mar. 9, 2020.
Decision to grant issued in European Application No. 18153253.2 on Dec. 17, 2020, 2 pages.
English translation of CN Notice of Allowance dated Sep. 21, 2022 for CN Application No. 201810072684, 3 page(s).
English Translation of CN Office Action, including Search Report, Mailed on Mar. 3, 2022 for CN Application No. 201810072684, 11 pages.
European Office Action from Application No. 18153253.2, dated Jun. 28, 2019, 4 pages.
European search opinion Mailed on Jun. 20, 2018 for EP Application No. 18153253, 6 pages (Previously recorded with incorrect date.).
European search report Mailed on Jun. 20, 2018 for EP Application No. 18153253, 2 page(s).
Examiner initiated interview summary (PTOL-413B) Mailed on Nov. 27, 2019 for U.S. Appl. No. 15/414,957.
Examiner initiated interview summary (PTOL-413B) Mailed on Nov. 27, 2019 for U.S. Appl. No. 15/414,957, 1 page(s).
Extended European Search Report and Written Opinion from related EP Application No. 18153253.2 issued on Jun. 18, 2020, 11 pages.
Final Rejection Mailed on Apr. 19, 2019 for U.S. Appl. No. 15/414,957, 7 page(s).
Final Rejection Mailed on May 4, 2021 for U.S. Appl. No. 16/809,653.
Intention to Grant for European Patent Application dated August , 2020, 5 pages.
Intention to grant (signatures) Mailed on Aug. 5, 2020 for EP Application No. 18153253, 1 page(s).
Non-Final Rejection Mailed on Jan. 9, 2023 for U.S. Appl. No. 17/524,238.
Non-Final Rejection Mailed on Jul. 21, 2023 for U.S. Appl. No. 17/524,238, 6 page(s).
Non-Final Rejection Mailed on Sep. 25, 2020 for U.S. Appl. No. 16/809,653, 6 page(s).
Non-Final Rejection Mailed on Sep. 27, 2018 for U.S. Appl. No. 15/414,957, 7 page(s).
Notice of Allowance and Fees Due (PTOL-85) Mailed on Aug. 11, 2021 for U.S. Appl. No. 16/809,653.
Notice of Allowance and Fees Due (PTOL-85) Mailed on Nov. 27, 2019 for U.S. Appl. No. 15/414,957, 8 page(s).
Notice of Allowance and Fees Due (PTOL-85) Mailed on Oct. 17, 2023 for U.S. Appl. No. 17/524,238, 2 page(s).
Notice of Allowance and Fees Due (PTOL-85) Mailed on Sep. 1, 2023 for U.S. Appl. No. 17/524,238, 7 page(s).
Notice of Allowance received for U.S. Appl. No. 16/809,653, mailed on Aug. 11, 2021, 8 pages.
U.S. Appl. No. 17/524,238, filed Nov. 11, 2021, U.S. Pat. No. 11,873,163, Issued.
U.S. Appl. No. 16/809,653, filed Mar. 5, 2020, U.S. Pat. No. 11,198,560, Issued.
U.S. Appl. No. 15/414,957, filed Jan. 25, 2017, U.S. Pat. No. 10,611,568, Issued.

AS/RS LIFT HAVING VERTICALLY-ALIGNED DUAL CARRIAGES

CROSS REFERENCE TO RELATED APPLICATIONS

This application is a continuation of U.S. application Ser. No. 17/524,238, filed Nov. 11, 2021, which is a continuation of U.S. application Ser. No. 16/809,653, filed Mar. 5, 2020 (now U.S. Pat. No. 11,198,560) which is a continuation of U.S. application Ser. No. 15/414,957, filed Jan. 25, 2017, (now U.S. Pat. No. 10,611,568), the entire contents of which are incorporated herein by reference.

FIELD

The present disclosure relates generally to material handling of containers, packages, and discrete articles, and more specifically to techniques for moving product into and out of an automatic storage and retrieval system (AS/RS) using vertical lifts.

BACKGROUND

In order to reduce the cost of storing a large inventory, increasingly retailers and distributors rely upon systems that can rapidly receive wholesale quantities of particular articles and create subsets of different articles as consumer or store replenishment orders. In some instances, a large number of possible types of articles can be selected from to complete a particular order. Automation allows conveying selected articles from a receiving location, sorting the needed articles into an order container, and transporting the completed order container to a shipping location. Generally, human interaction is required along some portion of the otherwise automated material handling system.

AS/RS systems are designed for automated storage and retrieval of parts and items in manufacturing, distribution, retail, wholesale and institutions. They first originated in the 1960s, initially focusing on heavy pallet loads but with the evolution of the technology the handled loads have become smaller. The systems operate under computerized control, maintaining an inventory of stored items. Retrieval of items is accomplished by specifying the item type and quantity to be retrieved. The computer determines where in the storage area the item can be retrieved from and schedules the retrieval. It directs the proper automated storage and retrieval machine (SRM) to the location where the item is stored and directs the machine to deposit the item at a location where it is to be picked up. A system of conveyors and or automated guided vehicles, such as shuttles, are sometimes part of the AS/RS system. These take loads into and out of the storage area and move them to the manufacturing floor, loading docks, palletizer, or order fulfillment station. To store items, the pallet or tray is placed at an input station for the system, the information for inventory is entered into a computer terminal and the AS/RS system moves the load to the storage area, determines a suitable location for the item, and stores the load. As items are stored into or retrieved from the racks, the computer updates its inventory accordingly.

The benefits of an AS/RS system include reduced labor for transporting items into and out of inventory, reduced inventory levels, more accurate tracking of inventory, and space savings. Items are often stored more densely than in systems where items are stored and retrieved manually. The trend towards Just In Time production often requires sub-pallet level availability of production inputs, mixed pallet outputs, or e-commerce order fulfillment, and AS/RS is a much faster way of organizing the storage of smaller items next to production lines.

One AS/RS technology is known as shuttle technology. In this technology the horizontal movement is made by independent shuttles each operating on one level of a rack while a lift at a fixed position within the rack is responsible for the vertical movement. By using two separate machines for these two axes, the shuttle technology is able to provide higher throughput rates than stacker cranes and multi-level shuttles. Storage and Retrieval Machines pick up or drop off loads to the rest of the supporting transportation system at specific stations, where inbound and outbound loads are precisely positioned for proper handling.

Often the vertical lift can be the limiting item with regard to overall throughput of the AS/RS system. Each vertical lift is also a significant portion of the cost of overall AS/RS solution. Adding additional vertical lifts can make the resulting solution too expensive and with an insufficient return on investment to implement.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with a material handling system including a storage rack having more than one vertically-spaced level. Each level has a plurality of storage locations accessible from an adjacent aisle. One or more shuttle vehicle service respective levels of the storage rack. A vertical lift has a vertical support structure positioned proximate to the storage rack. The vertical support structure has first and second carriages independently positionable along respective and first and second vertical portions of the vertical support structure. A first vertical drive system is coupled to the first carriage to position the first carriage to pick up and to deposit articles at selected levels within the first vertical portion of the vertical support structure. A second vertical drive system is coupled to the second carriage to position the second carriage to pick up and to deposit articles at selected levels within the second vertical portion of the vertical support structure. A processor subsystem is in communication with the first and second vertical drive systems to selectively position the first and second carriages at respective selective levels without colliding with each other.

In accordance with one or more aspects and corresponding disclosure thereof, various aspects are described in connection with a vertical lift including a vertical support structure positionable proximate to a storage rack. First and second carriages are received for vertical movement along the vertical support structure. Each one of the first and second carriage are independently positionable on the vertical support structure respectively in first and second vertical portions of the vertical support structure. A first vertical drive system is coupled to the first carriage to position the first carriage to pick up and to deposit articles at selected levels within the first vertical portion of the vertical support structure. The selected levels correspond to levels of a storage rack. The levels have a plurality of storage locations accessible from an adjacent aisle that are serviced by one or more shuttle vehicles. A second vertical drive system is coupled to the second carriage to position the second carriage to pick up and to deposit articles at selected levels within the second vertical portion of the vertical support structure. The levels correspond to levels of the storage rack. The levels have a plurality of storage locations accessible from an adjacent aisle that are serviced by one or more shuttle vehicles. A processor subsystem is in communication with the first and second vertical drive systems to selectively position the first and second carriages at respective selective levels without colliding with each other.

In accordance with one or more aspects and corresponding disclosure thereof, various aspects are described in connection with a method of moving articles into and out of an AS/RS using a vertical lift with two vertically-aligned carriages. The method includes conveying an article on an in-feed conveyor to a storage rack having more than one vertically-spaced level, each level having a plurality of storage locations accessible from an adjacent aisle. The method includes receiving a selected storage location for the article. The method includes selecting one carriage of a vertical lift to receive the product from the in-feed conveyor based at least in part on a corresponding level of the storage rack associated with the selected storage location. The vertical lift has a vertical support structure positioned proximate to the storage rack. The one carriage is vertically aligned with another carriage of the vertical lift. The carriages are independently positionable along respective first and second vertical portions of the vertical support structure. The method includes activating one vertical drive system to position the one carriage at the in-feed conveyor. The method includes receiving the article on the one carriage. The method includes activating the one vertical drive system to position the one carriage at the corresponding level to deposit the article for put away by a shuttle vehicle that is servicing the adjacent aisle. The method includes activating another vertical drive system to position the other carriage to avoid any collision with the one carriage during movement to receive and deposit the article.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
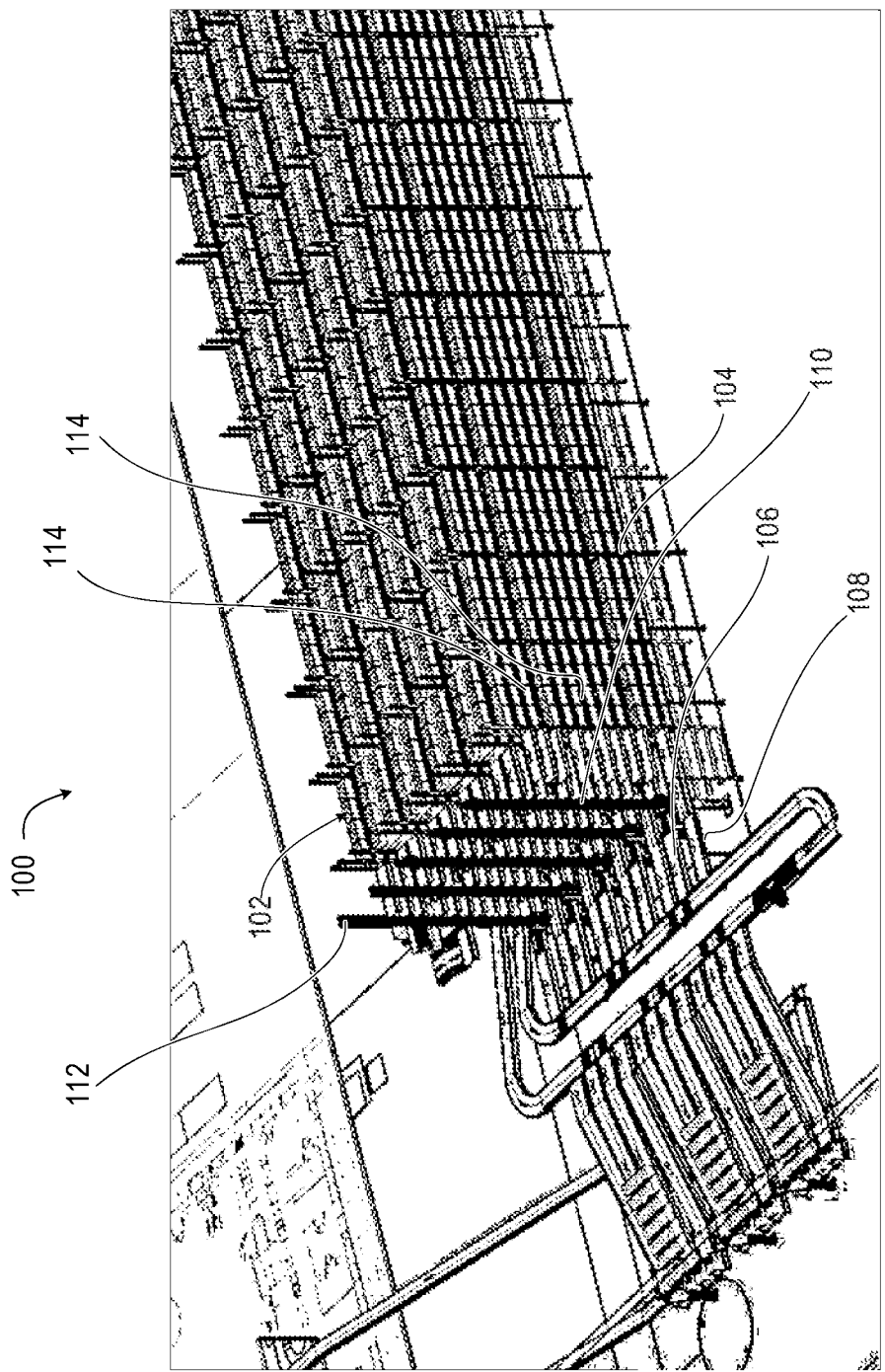
FIG. 1 illustrates a perspective view of a material handling system that includes an automated storage and retrieval system (AS/RS) utilizing dual carriage lifts, according to one or more embodiments.

FIG. 1 illustrates a material handling system 100 that includes an automated storage and retrieval system (AS/RS) 102. A storage rack 104 of the AS/RS 102 is provided with articles via in-feed conveyors 106 for storage. Articles are taken away from the storage rack 104 by out-feed conveyors 108 for order fulfillment, store replenishment, shipping, etc. Dual carriage vertical lifts 110 move articles between the in-feed and out-feed conveyors 104, 106 to an appropriate level of the storage rack 104. The vertical lifts 110 have a vertical support structure 112 positioned proximate to the storage rack 104 to pick up and to deposit articles at selected levels 114 within the storage rack 104.

Figure 2:
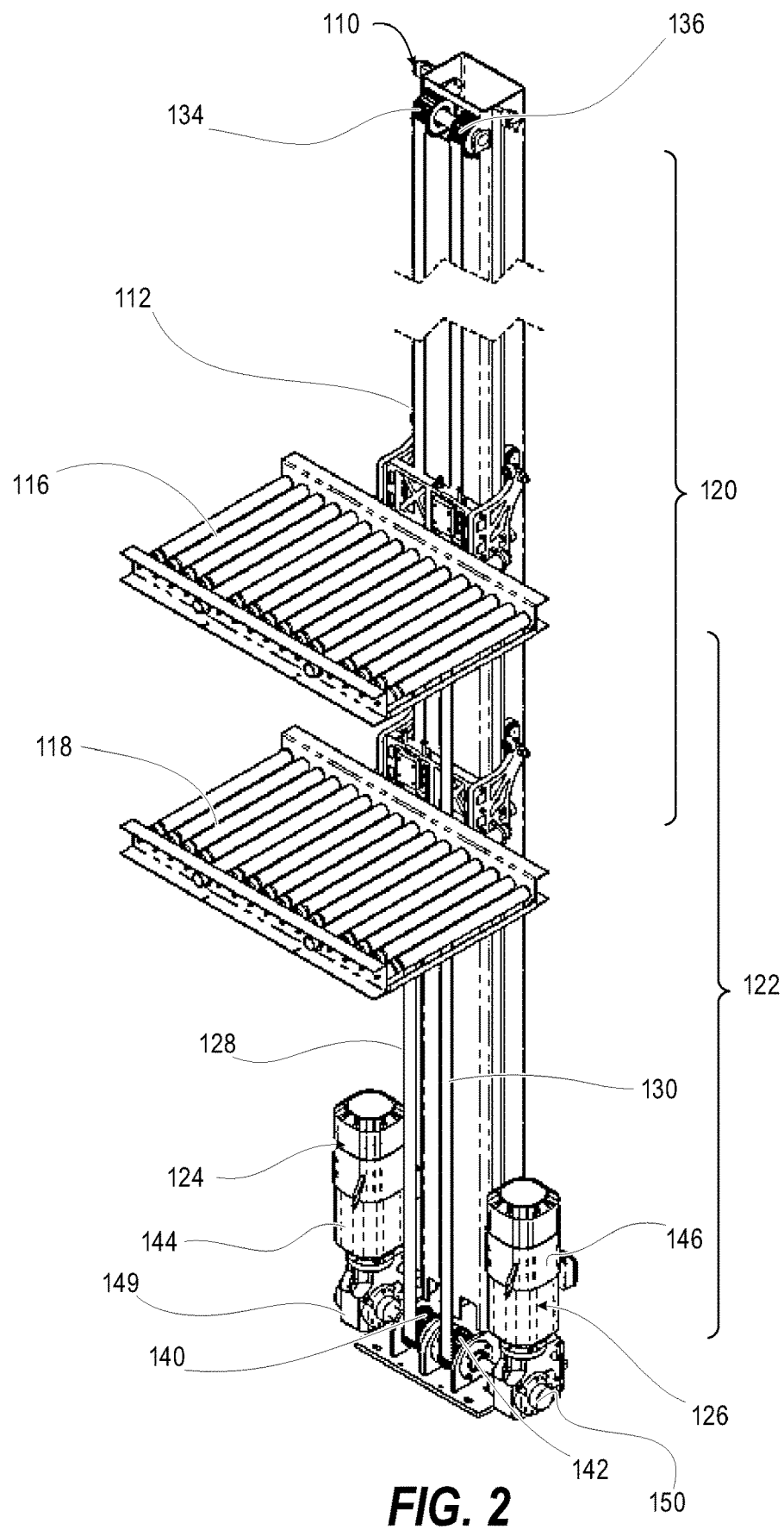
FIG. 2 illustrates an isometric view of an example dual carriage lift of the material handling system of FIG. 1, according to one or more embodiments.
Figure 3:
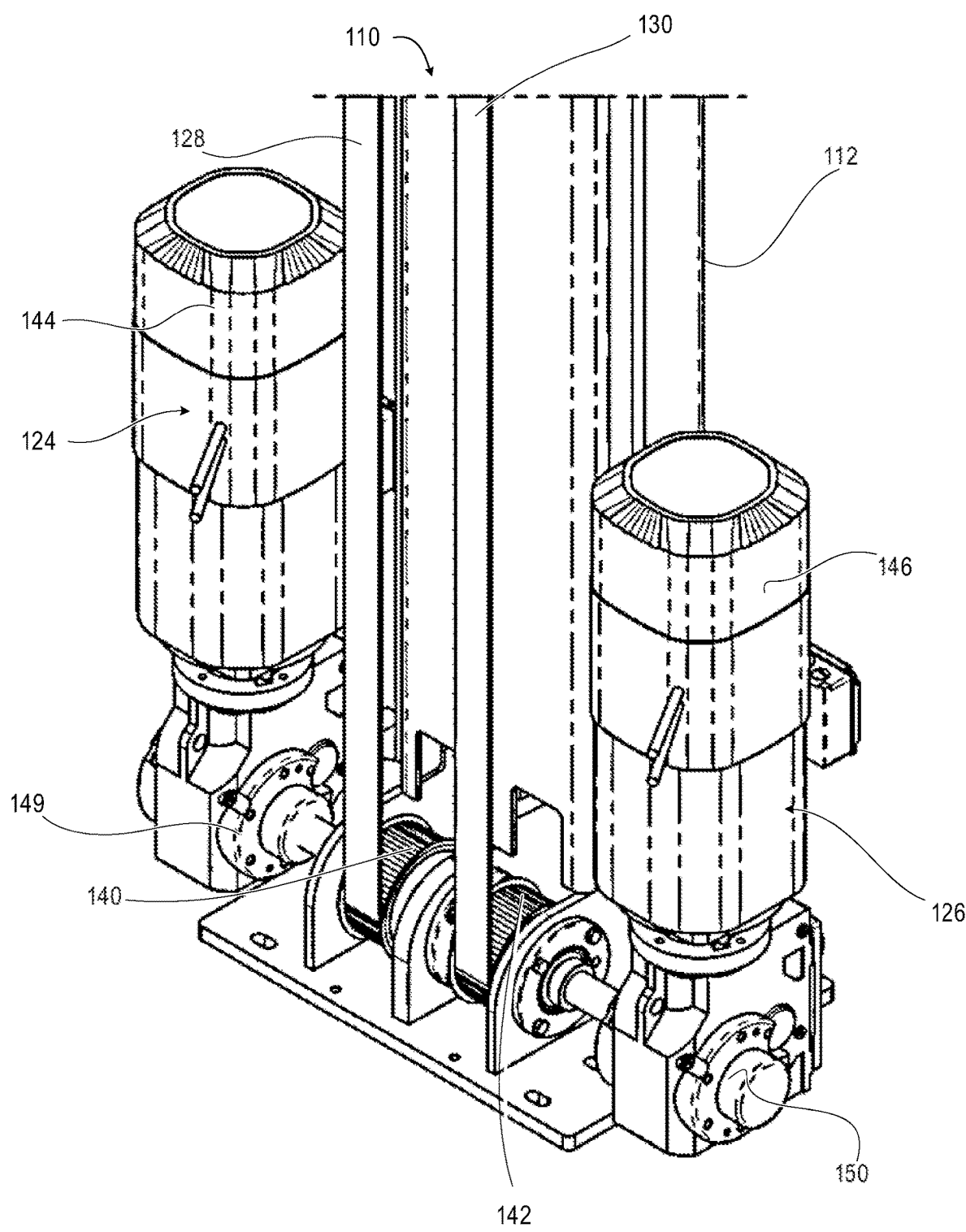
FIG. 3 illustrates an isometric detail view of one carriage of the dual carriage lift of FIG. 2, according to one or more embodiments.

FIG. 2 illustrates the vertical lift 110 having vertically aligned first and second carriages 116, 118 independently positionable along respective first and second vertical portions 120, 122 of the vertical support structure 112. A first vertical drive system 124 is coupled to the first carriage 116 to position the first carriage 116 within the first vertical portion 120 of the vertical support structure 112. A second vertical drive system 126 is coupled to the second carriage 118 to position the second carriage 118 within the second vertical portion 122 of the vertical support structure 112. In an exemplary embodiment, each vertical drive system comprises a drive belt 128, 130 received on a front side 132 of the vertical support structure 112 laterally offset and in vertical alignment with each other. The drive belts 128, 130 are received for vertical rotation respectively on passive, coaxial top pulleys 134, 136 and received on independently driven coaxial bottom pulleys 140, 142. FIGS. 2-3 illustrate that first and second drive motors 144, 146 of the first and second drive systems 124, 126 independently rotate the bottom pulleys 140, 142 through a 90° reduction transmission 148, 150 respectively.

Figure 4:
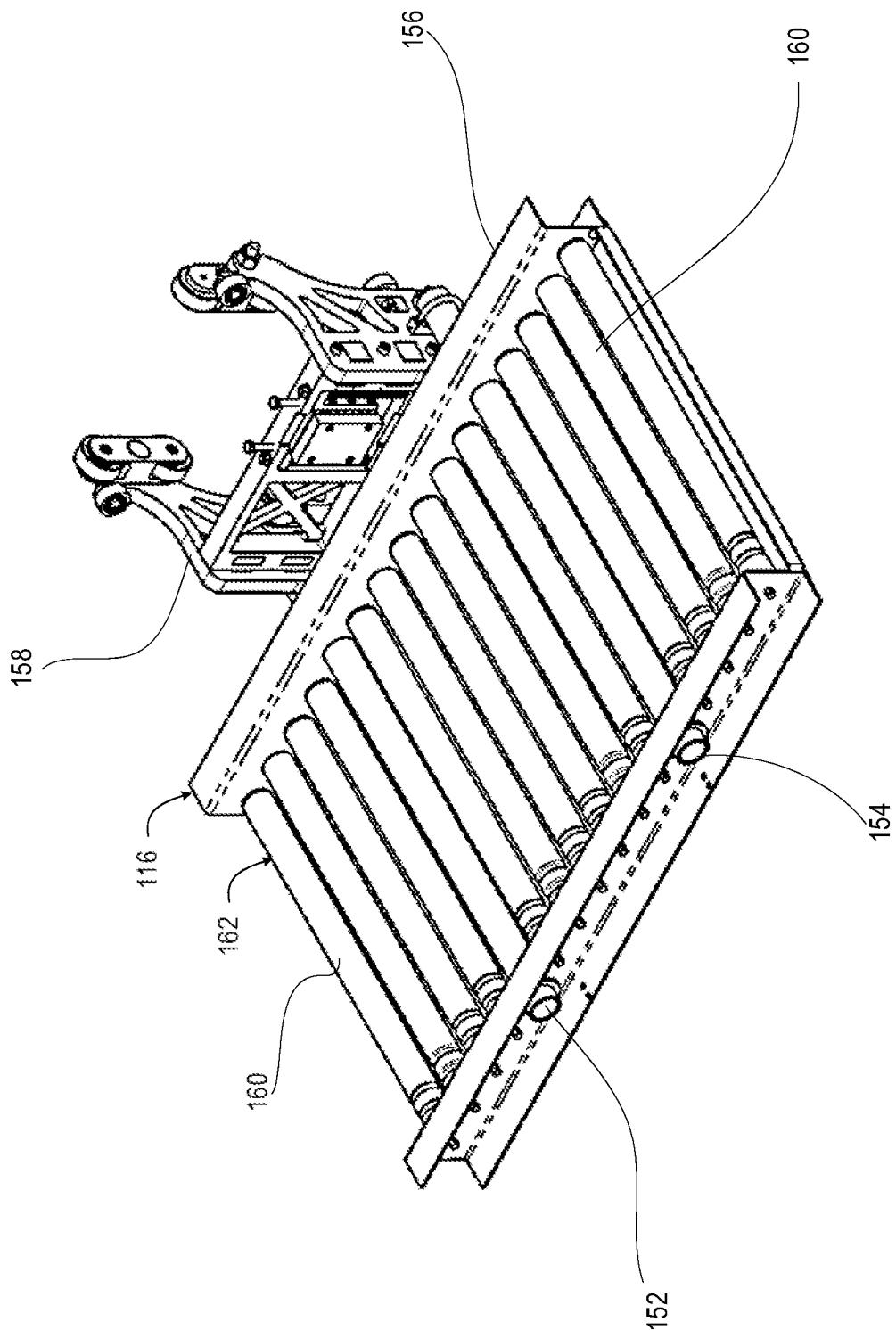
FIG. 4 illustrates an isometric detail view of dual vertical drive systems of the dual carriage lift of FIG. 2, according to one or more embodiments.

FIG. 4 illustrates that the first carriage 116 in two motor driven rollers (MDRs) 152, 154 that extend through a roller frame 156 to a mounting bracket 158. Each MDR 152, 154 is o-band coupled to a subset of non-powered rollers 160 to form a live roller conveyor 162 for moving articles onto and off of the vertical lift 110 (FIG. 2). Electrical power can be provided to the carriage through a power bus, electrical cables, etc.

Figure 5:
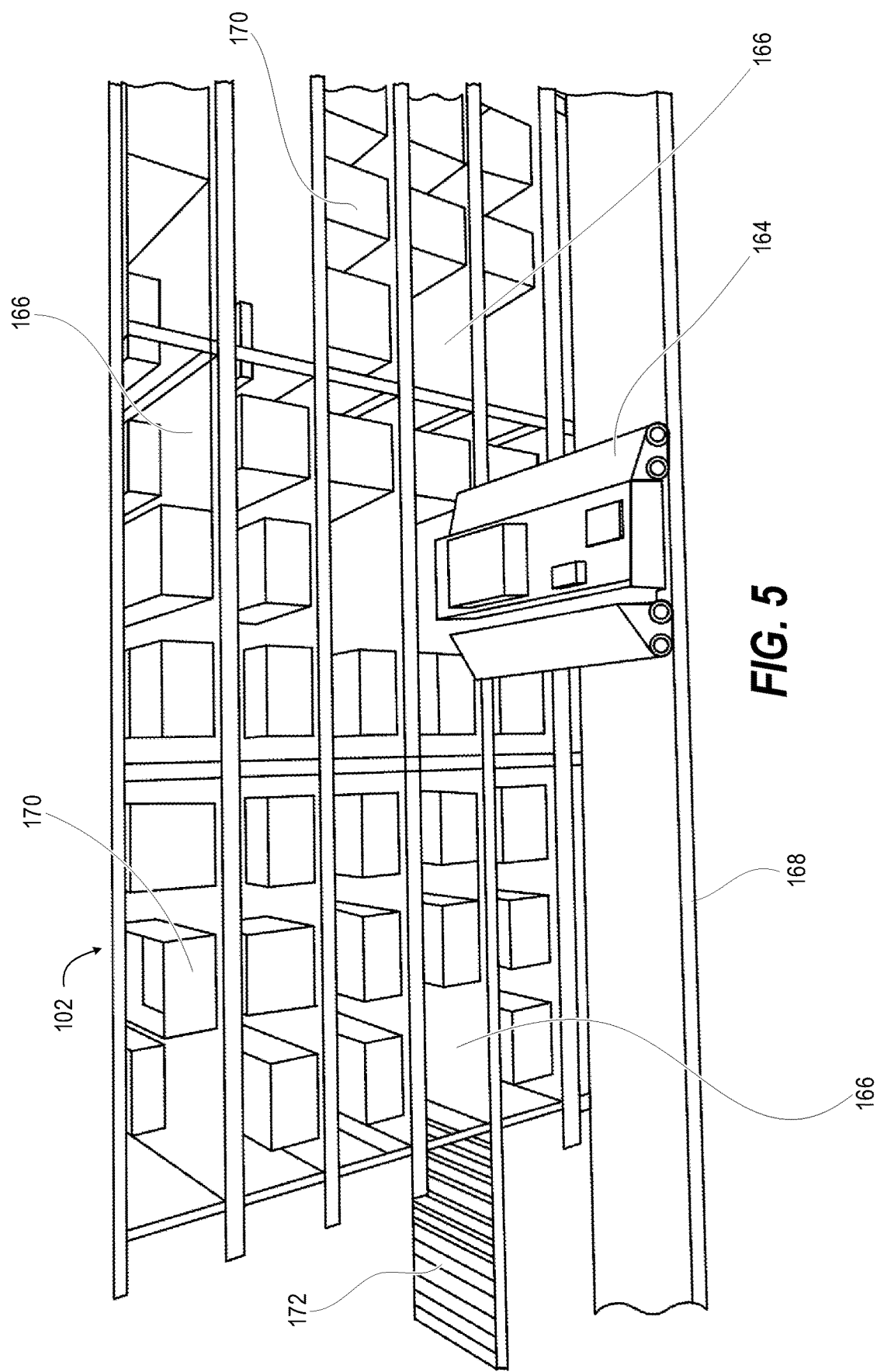
FIG. 5 illustrates a perspective view of a one level shuttle (OLS) vehicle servicing one aisle of the AS/RS of FIG. 1, according to one or more embodiments.

FIG. 5 illustrates that the AS/RS 102 can include autonomous shuttle vehicles 164 that service storage locations 166 along one or more aisles 168 within the storage rack 104. A dual carriage vertical lift 110 (FIG. 2) leaves article's 170 at a pickup and deposit (P/D) station 172 on an assigned level 114 and aisle 168 of the storage rack 104. A shuttle vehicle 164 picks up article/s 170 at a P/D station 172, moves them to an assigned storage location 166, and places the article 166 for storage. When required, a shuttle vehicles 164 retrieves the article/s 170 from the assigned storage location 166 and moves them to the P/D station 172 for pickup by a dual carriage vertical lift 110 (FIG. 2).

Figure 6:
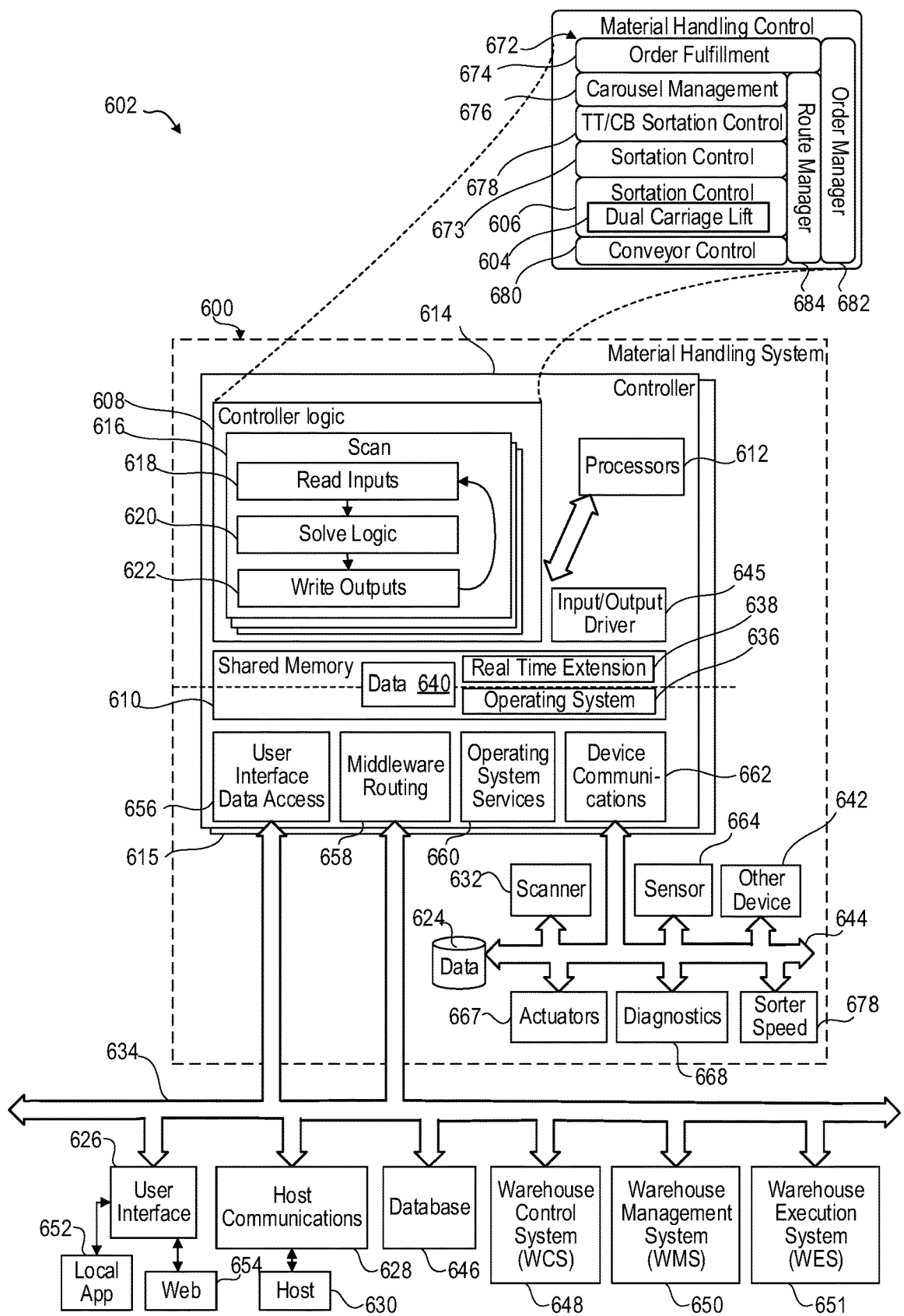
FIG. 6 illustrates a functional block diagram of an exemplary material handling control system, according to one or more embodiments.

In FIG. 6, an exemplary material handling system 600 of a distribution center processing architecture 602 is depicted wherein a dual carriage lift controller 604 is implemented within AS/RS controller 606. Controller logic 608 stored in computer-readable, shared memory 610 is executed by processors 612 in a controller 614 of the material handling system 600. One function of the controller logic 608 can be machine control logic. The controller 614 can be a primary controller supported by a backup controller 615 such that maintenance personal could swap cables or connections in the event of a failure without undue service downtime. Alternatively, a supervising system or the self-diagnostics could cause automatic switching between primary and backup in the event of a failure.

Scan logic, or merely a scan 616, refers to an implementation within the controller logic 608 wherein the processors 612 repeatedly execute a read input component 618, a solve logic component 620, and a write outputs component 622. By performing this sequence on a regular, periodic basis (deterministic), then the machine control logic can count scans to measure time. These three steps can be performed by a programmable logic controller (PLC), a personal computer (PC), a minicontroller, or microcontroller, etc. The solve logic component 620 can incorporate IF-THEN-ELSE branching logic, motion control, simple to sophisticates, hardlined to configured. Data, used by the solve logic component 620, can reside in the computer-readable, shared memory 610 or a data store device 624 (e.g., local, remote, cloud-based, etc.). A user interface 626 can be used to modify the solve logic component 620 such as by changing values that change the configuration or operation.

As is conventionally understood, the controller logic 608 can receive binary type inputs (e.g., switches, photo eyes, etc.) and generate binary type outputs (e.g., motor contacts, solenoid valves, lamp actuations, etc.). For example, in such an implementation, the user interface 626 can entail at least in part push button controls and lamps. More recent developments for controller logic 608 can include RS232 serial devices with legacy cathode ray tube (CRT) screens and keyboards that enable dialog screens and data display along with printers for generating reports. More modern display types such HDMI cabled or wirelessly coupled flat screen displays can also be supported. Barcode scanning can detect items processed by the material handling system 600. More recently, wired and wireless communication within the material handling system 600 and distribution center processing architecture 602 enable more distributed and remotely isolated implementations. For example, such communication architectures may employ bus couplers such a PROFIBUS and ETHERCAT.

The scan 616 can be one of many control scans to support increased speeds and complexities for portions of the material handling system 600. Certain logic is required to be performed during shorter intervals than others and so the scans 616 can have different periodicities, often selected for convenience to occur as multiples of the shortest duration scan 616. Examples include scans 616 of 1 ms and 2 ms for motion control, 32 ms for a merge subsystem, and 211 ms for general conveyor.

The material handling system 600 can incorporate host communications 628 to a host system 630 using serial ports, Ethernet, file transfer protocol (FTP), Transfer Control Protocol/Internet Protocol (TCP/IP), etc. Thereby, the host system 630 can make decisions for the material handling system 600. For example, a scanner 632 can see a barcode. The barcode is sent to the host system 630, such as via a bridge 634. The host system 630 responds with a destination. In response, the material handling system 600 causes the item with the barcode to go to that destination. Alternatively, the process can entail receiving a batch or download of destinations mapped to barcodes as part of a lookup table (LUT) for reference by the material handling system 600.

The computer-readable shared memory 610 can allow execution of an operating system (e.g., Windows, Linux, etc.) 636 to execute with a real time extension 638. The real time extension 638 assures that the machine control logic (controller logic 608) gets to execute completely on the time schedule required. Variations in the execution schedule are measured in microseconds. This approach assures the kind of precision required for the machine control while retaining access to the power and flexibility of a general purpose Operating system (e.g., Windows). PLCs, which can also be included for machine control, can operate in their own proprietary environments (hardware and software) and are integrated using communications. Data 640 from these communications is stored in computer-readable shared memory 610 for use in control decisions and for display on user interface 626. In an exemplary version, the data 640 is not controlled by the real time extension 638. In a similar fashion, other communicating devices 642 used in the control process (e.g., scales, printers) are connected via a private internal communications bus (e.g., Ethernet) 644 to the processors 612. The controller 614 can also have internal input/output drivers 645 to interface using specific communication protocols.

The distribution center processing architecture 602 can include other systems external to the material handling system 600 that communicate via the bridge 634, such as a database 646, a warehouse control system (WCS) 648, and a warehouse management system (WMS) 650. Alternatively or in addition, a vertically integrated warehouse execution system (WES) 651 can incorporate automation-level controls with order taking and fulfillment operations. In addition, the user interface 626 can facilitate remote or automated interaction via the user interface 626, depicted as a local application 652 and a web application 654. The controller 614 can include specific interfaces to support this interaction, such as a user interface data access component 656 to interact with user interface 626, middleware routing component 658 to interface with other external systems. Operating system services 660 and a device communication component 662 can also support the communications, such as sensors 664, actuators 667, diagnostic systems 668, and a sorter speed control 670.

The controller logic 608 can be functional described as material handling control layers 672 of software functionality, such as the sortation control 673, that address certain subsystems within a distribution center: order fulfillment 674, carousel management 676, tilt tray/cross belt (TT/CB) control 678, conveyor control 680, order manager 682 and route manager 684.

Figure 7:
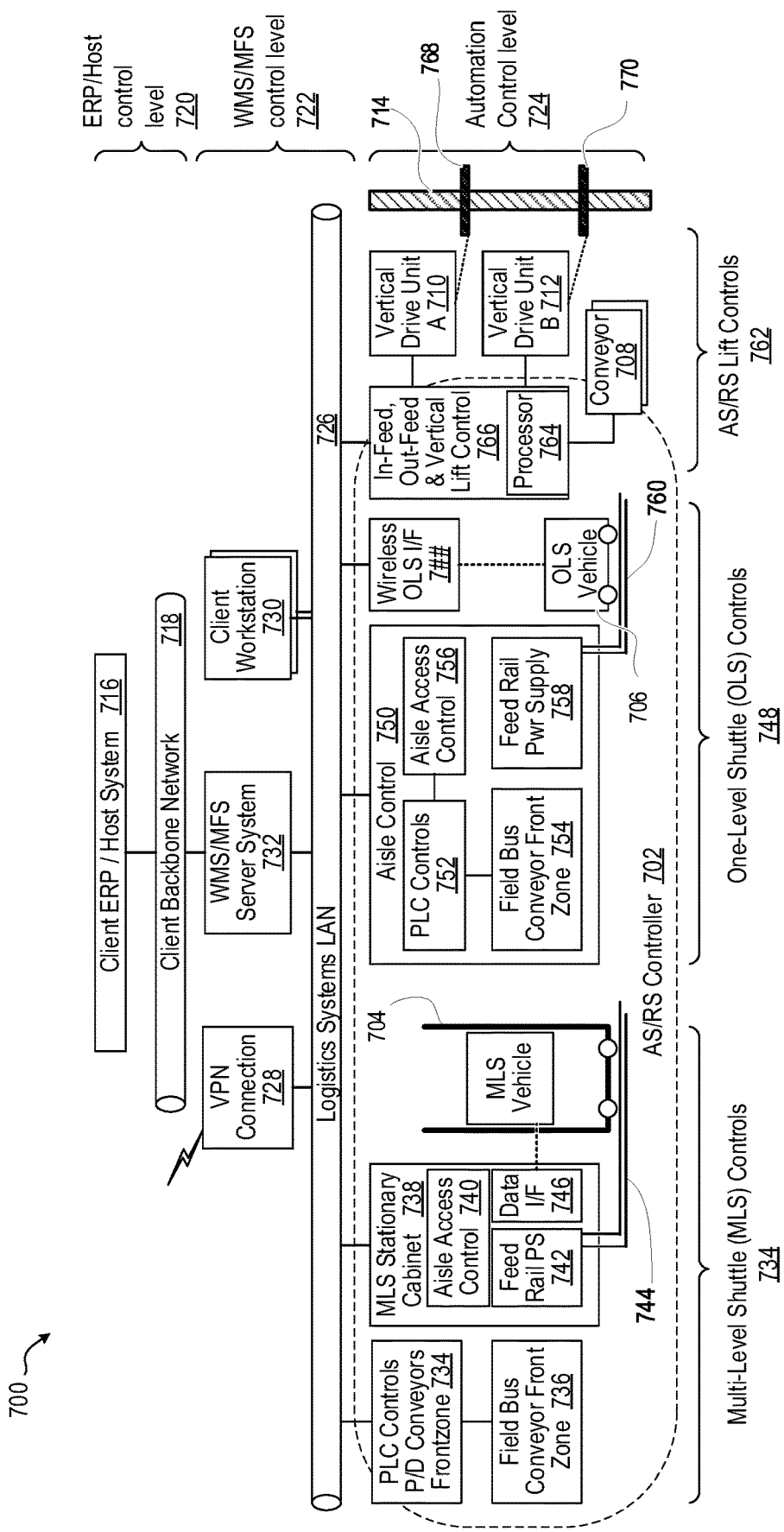
FIG. 7 illustrates a functional block diagram of an example material handling system having an example AS/RS controller with a distributed architecture, according to one or more embodiments.

FIG. 7 illustrates a material handling system 700 having an example AS/RS controller 702 with a distributed architecture to control: (i) one or more multi-level shuttle (MLS) vehicles 704, (ii) one or more one-level shuttle (OLS) vehicles 706, (iii) in-feed and out-feed conveyors 708, and (iv) independent vertical drive systems A and B 710, 712 of a dual carriage vertical lift 714. In one or more embodiments, the material handling system 100 includes a client Enterprise Resource Planning (ERP)/host system 716 that manages orders and inventory and other functions residing on a client backbone network 718 as part of an ERP/host level control 720. A warehouse management system (WMS)/Material Flow System (MFS) control level 722 manages warehouse specific functions between the ERP/host level control 720 and an automation control level 724 provided by the AS/RS controller 702. The WMS/MFS control level 722 can include computing environments that operate on a logistics system local access network (LAN) 726, such as a Virtual Private Network (VPN) connection 728, client workstations 730, and a WMS/MFS server system 732 that is also on the client backbone network 718.

AS/RS controller 702 can include multi-level shuttle controls 734 that control MLS vehicles 704. In one embodiment, programmable logic controller (PLC) 734 can manage P/D conveyors and frontzone via Field bus conveyor front zone network 736. MLS station cabinet 738 can include aisle access control 740 that provides safe access for maintenance personnel entering the storage rack 104 (FIG. 1). A feed rail power supply 742 can energize power strips 744 that power the MLS vehicles 704. Data interface (I/F) 746 can wireless communicate with the MLS vehicles 704 to direct article to and from assigned storage locations.

AS/RS controller 702 can include OLS controls 748 to control OLS vehicles 706. For example, stationary aisle controls 750 can include PLC controls 752 that interfaces with a field bus conveyor front zone 754 as well as aisle access controls 756 for safe access to the storage rack 104 (FIG. 1) by personnel. Feed rail power supply 758 can energize power strips 760 for powering OLS vehicles 706.

AS/RS controller 702 can include AS/RS lift controls 762 including a processor subsystem 764, such as a PLC controller, that executes in-feed, out-feed and vertical lift controls 766. The processor subsystem 764 assigns dual carriages 768, 770 to move without colliding.

Figure 8:
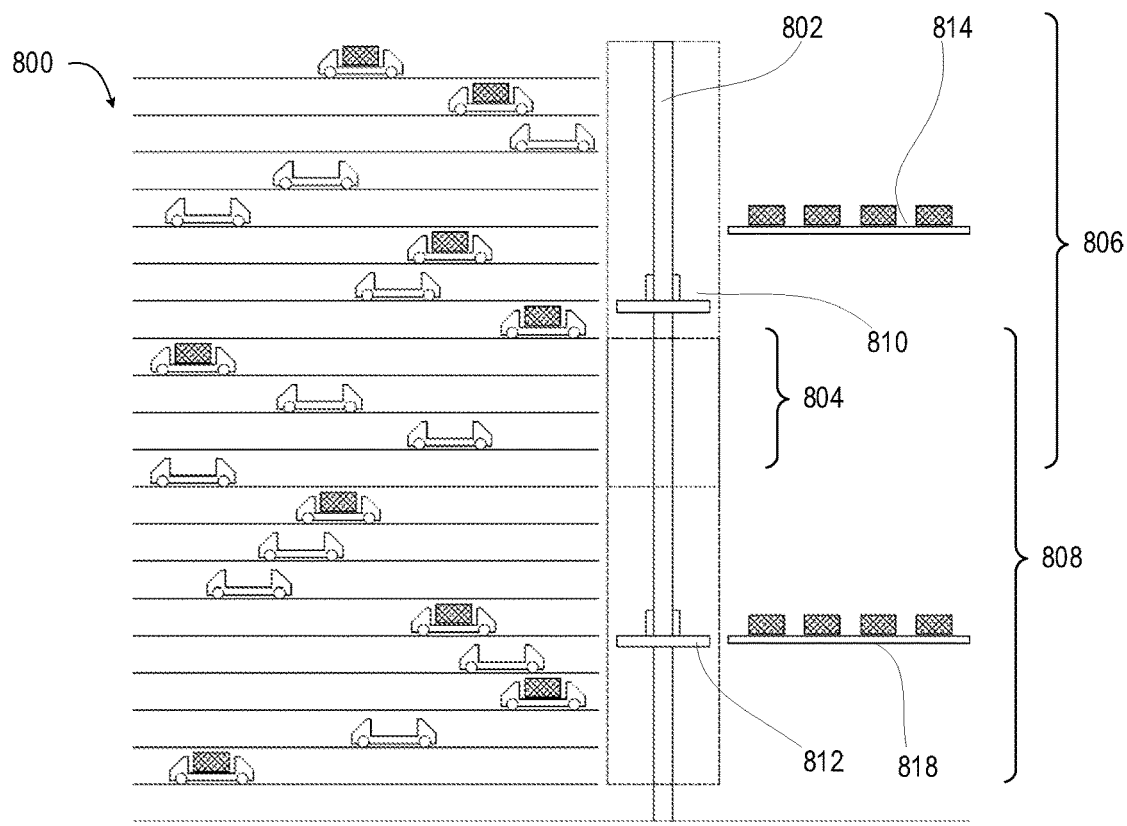
FIG. 8 illustrates a side view of a first version of an AS/RS that is serviced by a dual carriage lift employing an overlap in vertical travel zones and in-feed and out-feed conveyors exclusively serviced by one carriage respectively, according to one or more embodiments.
Figure 9:
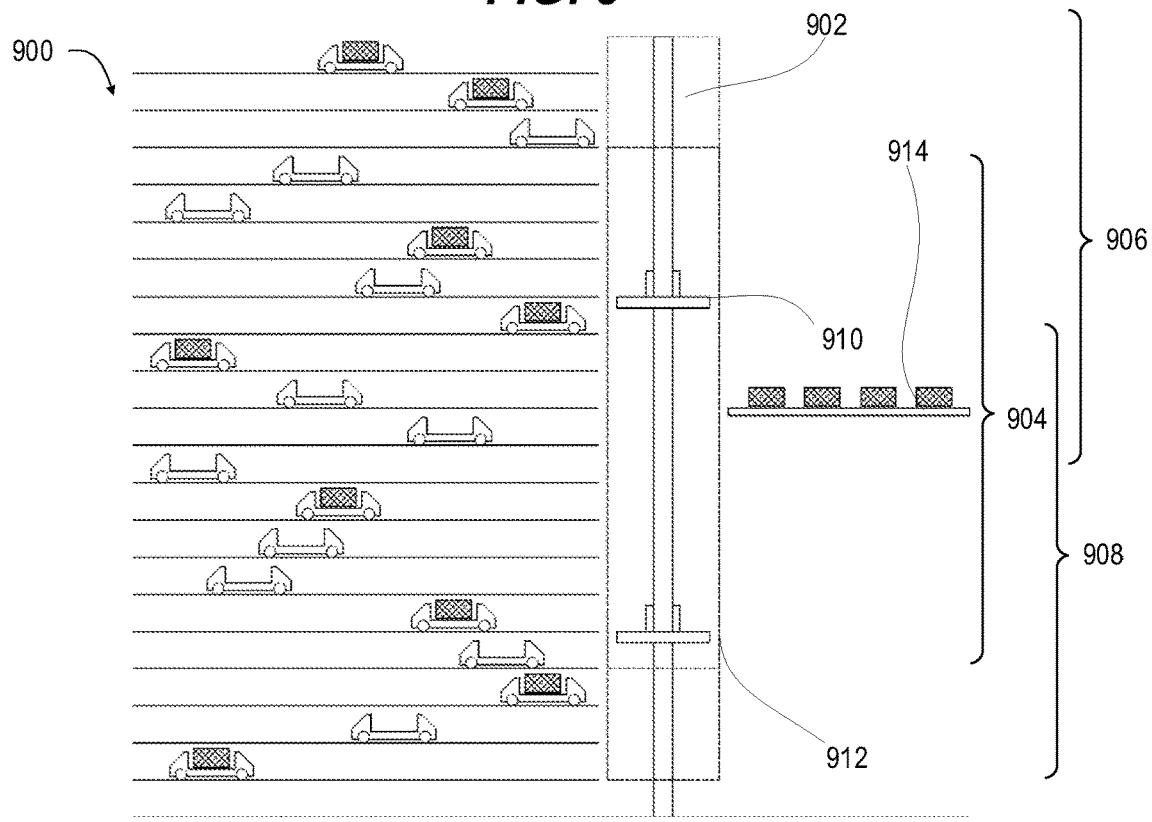
FIG. 9 illustrates a side view of a second version of an AS/RS that is serviced by a dual carriage lift employing a large overlap of vertical travel zones and in-feed and out-feed conveyors serviced by either carriage, according to one or more embodiments.
Figure 10:
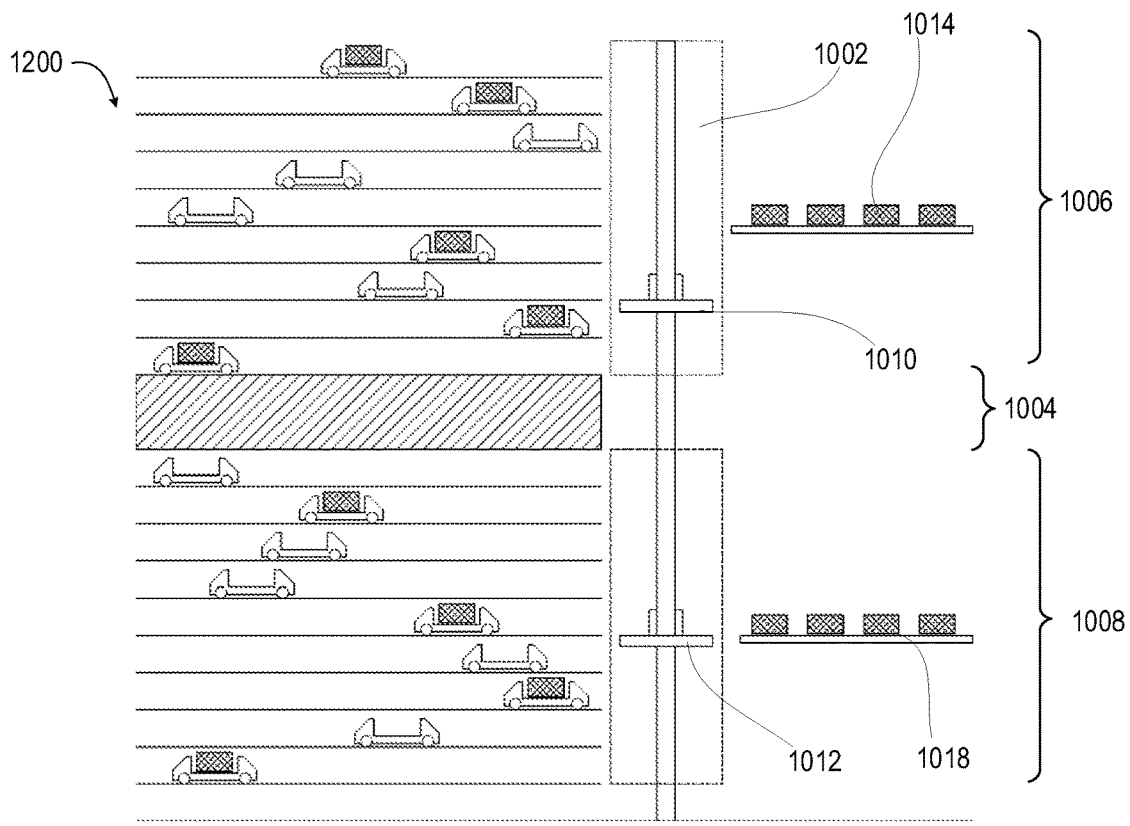
FIG. 10 illustrates a side view of a third version of an AS/RS that is serviced by a dual carriage lift employing non-overlapping vertical travel zones and in-feed and out-feed conveyors exclusively serviced by one carriage respectively, according to one or more embodiments.
Figure 11:
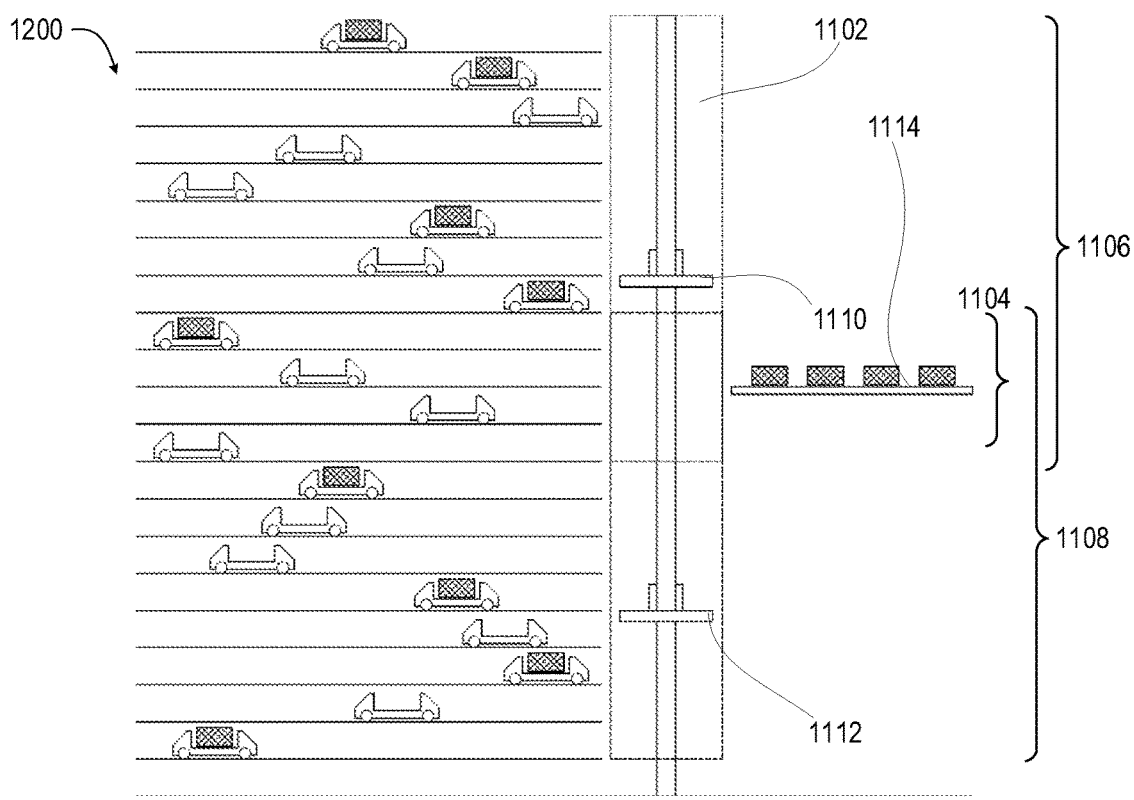
FIG. 11 illustrates a side view of a fourth version of an AS/RS that is serviced by a dual carriage lift employing a small overlap in vertical travel zones and in-feed and out-feed conveyors exclusively serviced by one carriage, according to one or more embodiments.
Figure 12:
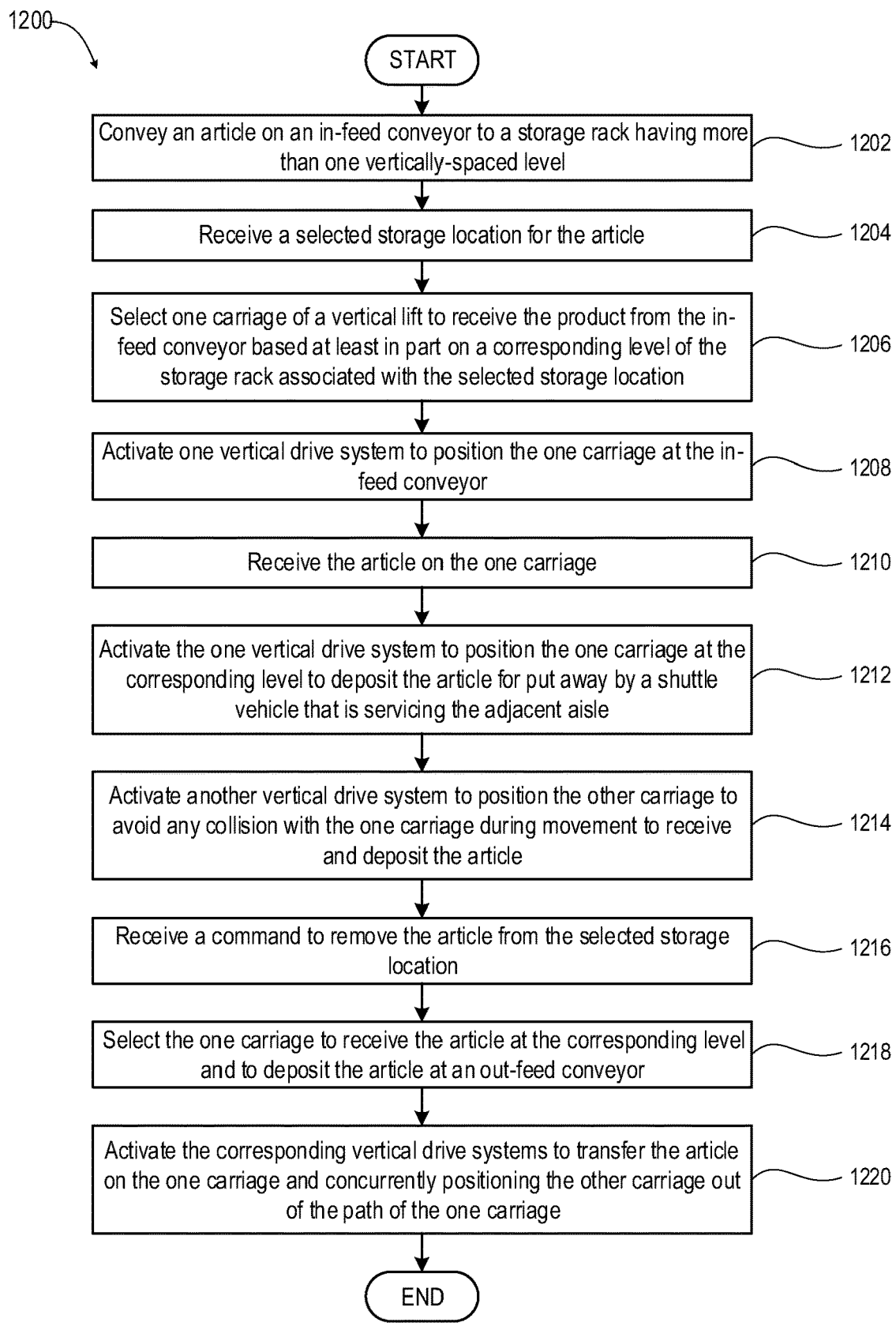
FIG. 12 illustrates a flow diagram of a method of increasing throughput into and out of an AS/RS using a dual carriage lift, according to one or more embodiments.

For one example, FIG. 8 illustrates a first version of an AS/RS 800 that is serviced by a dual carriage lift 802 employing an overlap 804 in vertical travel zones 806, 808 respectively of carriages 810, 812. Upper in-feed and out-feed conveyors 814 are exclusively serviced by carriage 810. Lower in-feed and out-feed conveyors 818 are exclusively serviced by carriage 812. FIG. 9 illustrates a second version of an AS/RS 900 that is serviced by a dual carriage lift 902 employing a large overlap 904 of vertical travel zones 906, 908 respectively of carriages 910, 912. In-feed and out-feed conveyors 914 aligned with the large overlap 904 are serviced by either carriage 910, 912. FIG. 10 illustrates a third version of an AS/RS 1000 that is serviced by a dual carriage lift 1002 employing a non-overlap zone 1104 between vertical travel zones 1006, 1008. Upper in-feed and out-feed conveyors 1014 are exclusively serviced by carriage 1010. Lower in-feed and out-feed conveyors 1018 are exclusively serviced by carriage 1012. FIG. 11 illustrates a fourth version of an AS/RS 1100 that is serviced by a dual carriage lift 1102 employing a small overlap 1104 in vertical travel zones 1106, 1108 respectively of carriages 1110, 1112. Upper in-feed and out-feed conveyors 1114 are exclusively serviced by carriage 1110. Lower in-feed and out-feed conveyors 1118 are exclusively serviced by carriage 1112.

In use, method 1200 illustrates a method of increasing throughput of articles transferred into and out of an AS/RS storage rack using a single vertical lift. In one or more embodiments, the method 1200 includes conveying an article on an in-feed conveyor to a storage rack having more than one vertically-spaced level. Each level having a plurality of storage locations accessible from an adjacent aisle (block 1202). Method 1200 includes receiving a selected storage location for the article (block 1204). Method 1200 includes selecting one carriage of a vertical lift to receive the product from the in-feed conveyor based at least in part on a corresponding level of the storage rack associated with the selected storage location. The vertical lift has a vertical support structure positioned proximate to the storage rack. The one carriage is vertically aligned with another carriage of the vertical lift. Each carriage is independently positionable along respective first and second vertical portions of the vertical support structure (block 1206). Method 1200 includes activating one vertical drive system to position the one carriage at the in-feed conveyor (block 1208). Method 1200 includes receiving the article on the one carriage (block 1210). Method 1200 includes activating the one vertical drive system to position the one carriage at the corresponding level to deposit the article for put away by a shuttle vehicle that is servicing the adjacent aisle (block 1212). Method 1200 includes activating another vertical drive system to position the other carriage to avoid any collision with the one carriage during movement to receive and deposit the article (block 1214). Method 1200 includes receiving a command to remove the article from the selected storage location (block 1216). Method 1200 includes selecting the one carriage to receive the article at the corresponding level and to deposit the article at an out-feed conveyor (block 1218). Method 1200 includes activating the corresponding vertical drive systems to transfer the article on the one carriage and concurrently positioning the other carriage out of the path of the one carriage (block 1220).

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executes instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The phrase "processing system" is used to refer to one or more processors, which may be included in a single device, or distributed among multiple physical devices.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

The various embodiments may be implemented in any of a variety of computing devices. A computing device will typically include a processor coupled to volatile memory and a large capacity nonvolatile memory, such as a disk drive of Flash memory. The computing device may also include a floppy disc drive, solid state drive, and a compact disc (CD) drive coupled to the processor. The computing device may also include a number of connector ports coupled to the processor for establishing data connections or receiving external memory devices, such as a USB or FireWire™ connector sockets, or other network connection circuits for establishing network interface connections from the processor to a network or bus, such as a local area network coupled to other computers and servers, the Internet, the public switched telephone network, and/or a cellular data network. The computing device may also include the trackball or touch pad, keyboard, and display all coupled to the processor.

The various embodiments may also be implemented on any of a variety of commercially available server devices. Such a server typically includes a processor coupled to volatile memory and a large capacity nonvolatile memory, such as a disk drive. The server may also include a floppy disc drive, compact disc (CD) or DVD disc drive coupled to the processor. The server may also include network access ports coupled to the processor for establishing network interface connections with a network, such as a local area network coupled to other computers and servers, the Internet, the public switched telephone network, and/or a cellular data network.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A material handling system comprising:
a storage rack having vertically-spaced levels;
a vertical lift having a vertical support structure positioned proximate to the storage rack and having a vertically aligned first carriage and second carriage independently positionable along the vertical support structure;
at least one vertical drive system, wherein the at least one vertical drive system is configured to position at least one of the first carriage and the second carriage at selected levels of the vertical support structure; and
a processor subsystem in communication with the at least one vertical drive system to:
selectively position the first carriage and the second carriage at respective selective levels along the vertical support structure, wherein the at least one vertical drive system comprises a drive belt on a front side of the vertical support structure, wherein the drive systems include a first drive motor and a second drive motor to independently rotate the bottom pulleys through a 90° reduction transmission.

2. The material handling system of claim 1, further comprising a shuttle vehicle that services a vertically-spaced level of the storage rack.

3. The material handling system of claim 1, wherein each vertically spaced level defines a plurality of storage locations accessible from an adjacent aisle.

4. The material handling system of claim 1, further comprising at least one infeed conveyor and at least one out-feed conveyor adjacent to the vertical support structure that are serviced by a selected one of the first carriage or the second carriage.

5. The material handling system of claim 1, wherein:
a first vertical portion of the vertical support structure comprises an overlapping zone and a first exclusive zone above the overlapping zone; and
a second vertical portion of the vertical support structure comprises the overlapping zone and a second exclusive zone below the overlapping zone.

6. The material handling system of claim 5, further comprising:
at least one in-feed conveyor and at least one out-feed conveyor adjacent to a level of the first exclusive zone and serviced by the first carriage; and
at least one in-feed conveyor and at least one out-feed conveyor adjacent to a level of the second exclusive zone and serviced by the second carriage.

7. The material handling system of claim 5, wherein:
the first vertical portion is coextensive with the first exclusive zone and spaced apart from the second vertical portion that is coextensive with the second exclusive zone; and
the processor subsystem is further configured to position the first carriage within the first exclusive zone and selectively position the second carriage within the second exclusive zone to prevent collision.

8. The material handling system of claim 1, further comprising: a pickup and deposit (P/D) station on a selected level and aisle of the storage rack.

9. A vertical lift comprising:
a vertical support structure;
a first carriage and second carriage received for vertical movement along the vertical support structure, wherein each of the first carriage and the second carriage are independently positionable along a respective first vertical portion and a second vertical portion of the vertical support structure, wherein at least a portion of the first vertical portion and the second vertical portion of the vertical support structure overlap;
a dual vertical drive system configured to position the first carriage at selected levels within the first vertical portion of the vertical support structure and the second carriage at selected levels within the second vertical portion of the vertical support structure; and
a processor subsystem in communication with the dual vertical drive system to:
selectively position the first carriage and the second carriage at respective selective levels along the vertical support structure to avoid collision with each other, wherein the dual vertical drive system comprises drive belts on a front side of the vertical support structure laterally offset with each other, wherein the drive systems include a first drive motor and a second drive motor to independently rotate the bottom pulleys through a 90° reduction transmission.

10. The vertical lift of claim 9, wherein:
the first vertical portion comprises an overlapping zone and a first exclusive zone above the overlapping zone; and
the second vertical portion comprises the overlapping zone and a second exclusive zone below the overlapping zone.

11. The vertical lift of claim 10, wherein the first carriage and the second carriage are positionable to service at least one in-feed conveyor and at least one out-feed conveyor that are adjacent to the vertical support structure.

12. The vertical lift of claim 10, wherein:
the first carriage is positionable to service at least one in-feed conveyor and at least one out-feed conveyor that are adjacent to a level of the first exclusive zone; and
the second carriage is positionable to service at least one in-feed conveyor and at least one out-feed conveyor that are adjacent to a level of the second exclusive zone.

13. The vertical lift of claim 10, wherein:
the first vertical portion is coextensive with the first exclusive zone and spaced apart from the second vertical portion that is coextensive with the second exclusive zone; and
the processor subsystem is further configured to position the first carriage within the first exclusive zone and selectively position the second carriage within the second exclusive zone to prevent collision.

14. The vertical lift of claim 9, wherein the first carriage and the second carriage comprise at least motor driven roller (MDR).

15. A method comprising:
selecting a first carriage of a vertical lift to transfer an article, wherein the vertical lift comprises a vertical support structure having a vertically aligned first carriage and a vertically aligned second carriage independently positionable along respective vertical portions of the vertical support structure, wherein at least a portion of the vertical portions of the vertical support structure overlap;
positioning the first carriage at selected levels within the vertical portions of the vertical support structure to position the first carriage to transfer the article; and
positioning the second carriage at selected levels within the vertical portions of the vertical support structure to concurrently position the second carriage out of a path of the first carriage, wherein the drive systems include a first drive motor and a second drive motor to independently rotate the bottom pulleys through a 90° reduction transmission.

16. The method of claim 15, wherein transferring the article comprises receiving the article on the first carriage from an in-feed conveyor.

17. The method of claim 15, wherein transferring the article comprises receiving the article on the first carriage from the storage rack.

18. The method of claim 15, wherein transferring the article comprises depositing the article from the first carriage on an in-feed conveyor.

19. The method of claim 15, wherein transferring the article comprises depositing in the article from the first carriage to the storage rack.

20. The method of claim 15, further comprises selecting at least one first carriage or the second carriage to receive the article at a selected level and to deposit the article at an out-feed conveyor.

* * * * *